Figure 1:
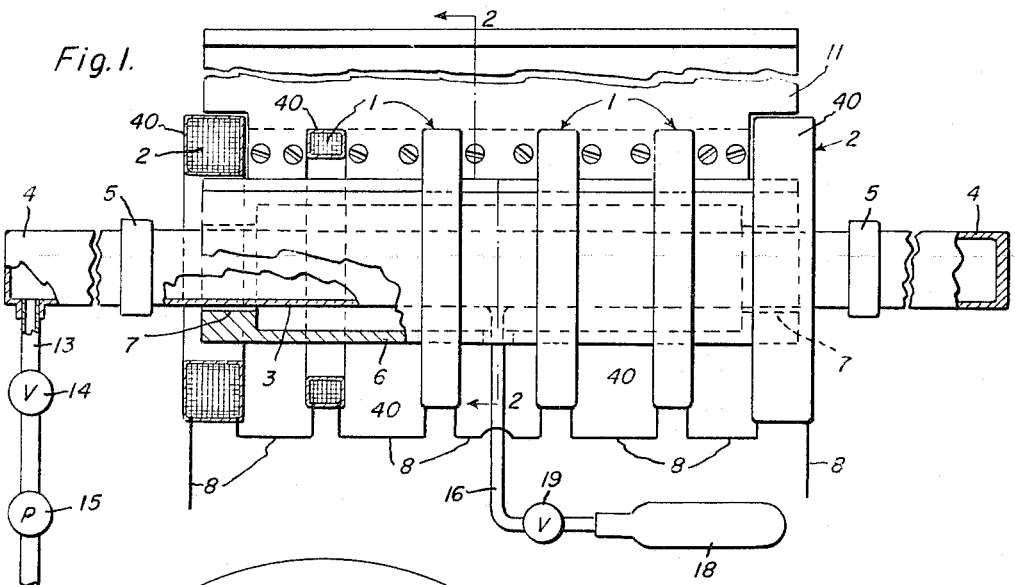

Dec. 6, 1966  H. HURWITZ, JR  3,290,219
PLASMA CONTAINMENT METHOD AND APPARATUS
Filed Sept. 19, 1963  3 Sheets-Sheet 1

Inventor:
Henry Hurwitz, Jr.
by John P. Dellitt
His Attorney.

Inventor:
Henry Hurwitz, Jr.
by John P. DeWitt
His Attorney.

Dec. 6, 1966   H. HURWITZ, JR   3,290,219
PLASMA CONTAINMENT METHOD AND APPARATUS
Filed Sept. 19, 1963   3 Sheets-Sheet 3
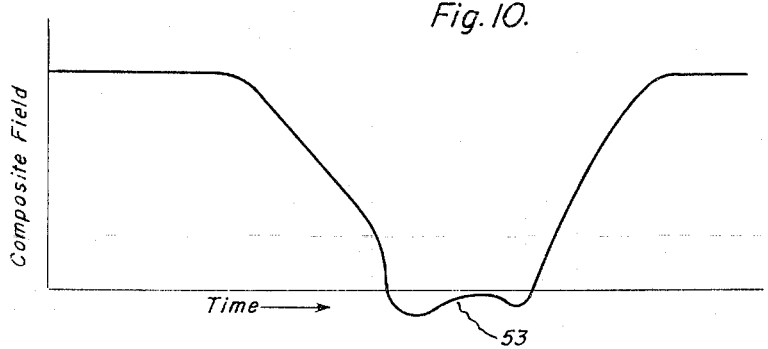
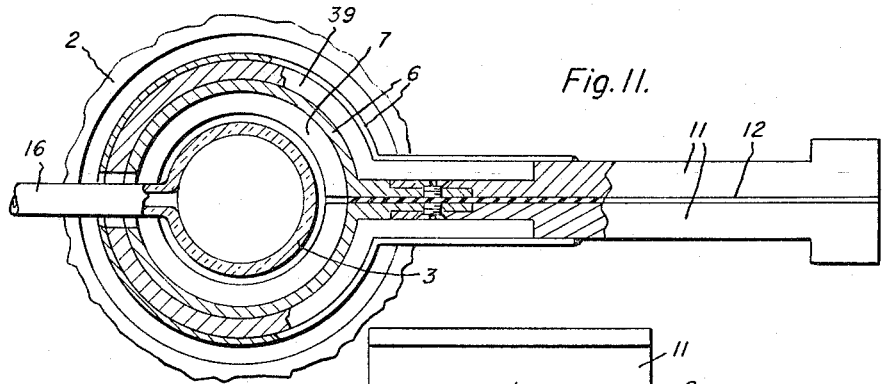
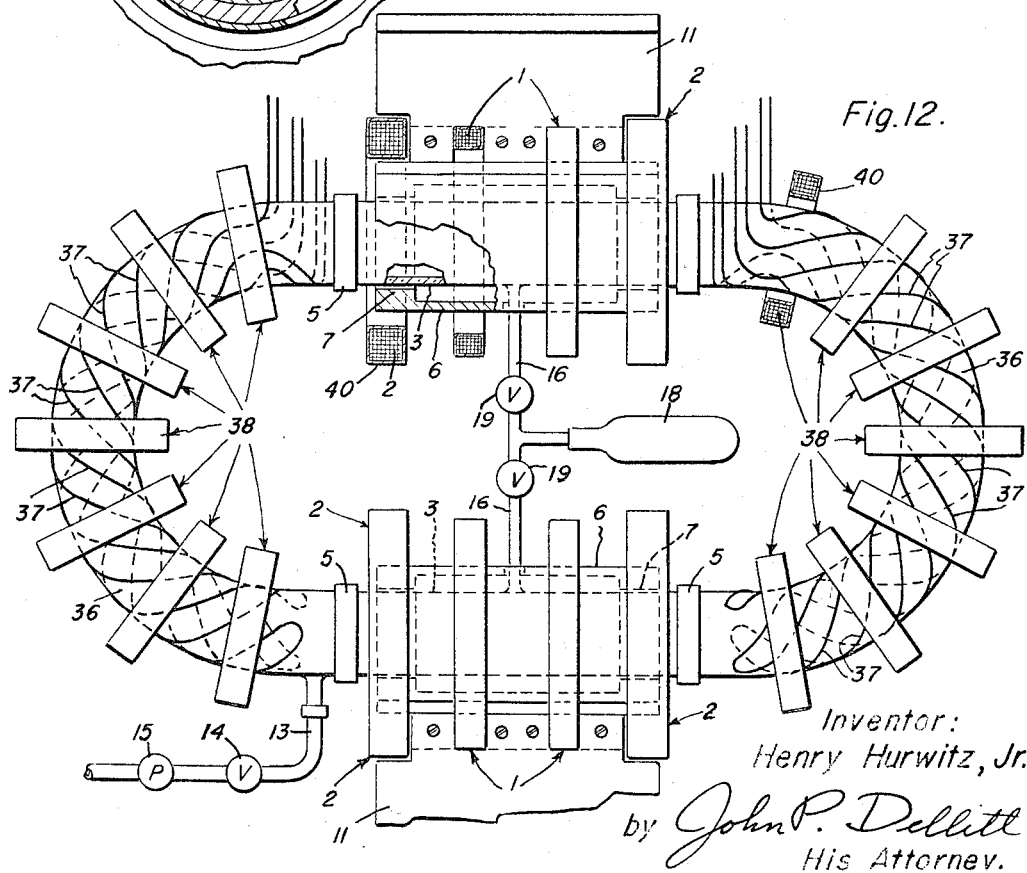
Inventor:
Henry Hurwitz, Jr.
by John P. Dellett
His Attorney.

3,290,219
PLASMA CONTAINMENT METHOD
AND APPARATUS
Henry Hurwitz, Jr., Schenectady, N.Y., assignor to General Electric Company, a corporation of New York
Filed Sept. 19, 1963, Ser. No. 310,096
16 Claims. (Cl. 176—3)

This invention relates to a method and apparatus for providing a rapid compression and sustained containment of a high temperature plasma.

A number of devices are known for magnetically compressing and to some degree containing gaseous plasma. In general an ionized plasma is compressed in a large magnetic field, which field may be applied externally to the plasma or generated by current flowing in the plasma itself. The compression desirably raises the plasma temperature to a value at which a fusion reaction may take place.

For the compressed plasma to be at all effective, it must not only be highly compressed but it should be held or contained in the compressed state for some definite period of time. To this end, the magnetic field is desirably shaped for holding the plasma in its compressed state. One very useful device employs a magnetic "mirror" geometry wherein a plasma discharge is contained within a magnetic field "bottle" axially surrounding the discharge, and having a higher field strength at either end of the plasma discharge to prevent escape of the plasma. Magnetic containment fields having toroidal topology such as the stellerator, Meyer-Schmidt or generalized Ioffe positive gradient type configuration are also known to have advantageous properties.

A particularly successful mirror-type arrangement, known as a theta pinch apparatus, is found capable of producing a high density, very high energy (1 kev. or more) plasma as a result of rapid pulsed plasma compression at high field strengths. In such an apparatus, a plasma discharge tube is axially surrounded by a one-turn coil comprising a conductive cylinder having axial inwardly extending raised portions or mirrors at each end of the cylinder. In exemplary operation, a capacitor bank charged to several tens of kilovolts is discharged through this single turn coil resulting in a current on the order of a million or more amperes flowing around the cylinder. The intense magnetic field generated thereby rapidly compresses a preionized plasma in the discharge tube, resulting in very high temperature conditions. The single turn may be "crow-barred" or short-circuited after the capacitor discharge in order to maintain the current for a period of time and provide plasma containment. However, the resulting field duration time in this and similar schemes cannot easily be raised to the extent desired for efficient fusion reaction without elaborate and relatively inefficient power crow-bar systems. Of course larger multi-turn coils would be capable of sustaining a magnetic field for a longer period of time. However, a high current in a larger coil is incapable of rapid change and is therefore not suitable for producing the rapid compression and attendant high plasma temperatures desired.

It is therefore an object of the present invention to provide an improved apparatus for enabling optimum rapid compression of a plasma to be followed by optimum containment thereof for a substantial period of time.

In accordance with the present invention a plasma is rapidly compressed and contained for a substantial period of time in plural magnetic fields, each in compressive relation to the plasma discharge. A first magnetic field, which may be produced by a relatively large or multi-turn coil, has a relatively long time constant and is considered a D.C. or quasi D.C. field. A second magnetic field, also in compressive relation to the discharge, is effective to oppose or cancel the first magnetic field in the area where the plasma heating is to be accomplished. This second field has a relatively short time constant, as compared to the aforementioned field, and therefore opposes the steady or quasi D.C. field for only a short period of time, on the order of microseconds. This second field may be considered a high-frequency field. As the second field concludes, the net resulting field acting upon the plasma rises rapidly to the relatively steady or quasi D.C. value. The rapid rise in the resultant field rapidly compresses the plasma in the manner of a theta pinch apparatus; however the field does not then immediately die out but may be preserved or, in fact, gradually increased for an extended period of time, e.g. for a time period on the order of milliseconds or longer. Therefore high temperature plasma containment time is extended to a more useful period.

In effect, the rapid substractive high-frequency magnetic field temporarily displaces the magnetic field lines produced by the steady or quasi D.C. field. Then the rapid decay of the subtractive field allows the D.C. field lines to rapidly "snap back" into their original position and compress the plasma, formed in the time interval when the resulting magnetic field is quite small. Thus a large field of extended time duration can be rapidly accelerated in its effect upon the plasma without encountering the usual problems of large back E.M.F. attendant to the usual long-time-constant coil. This advantage is gained by separating the sources of long time constant, and the rapid or short time constant components of the field.

Figure 2:
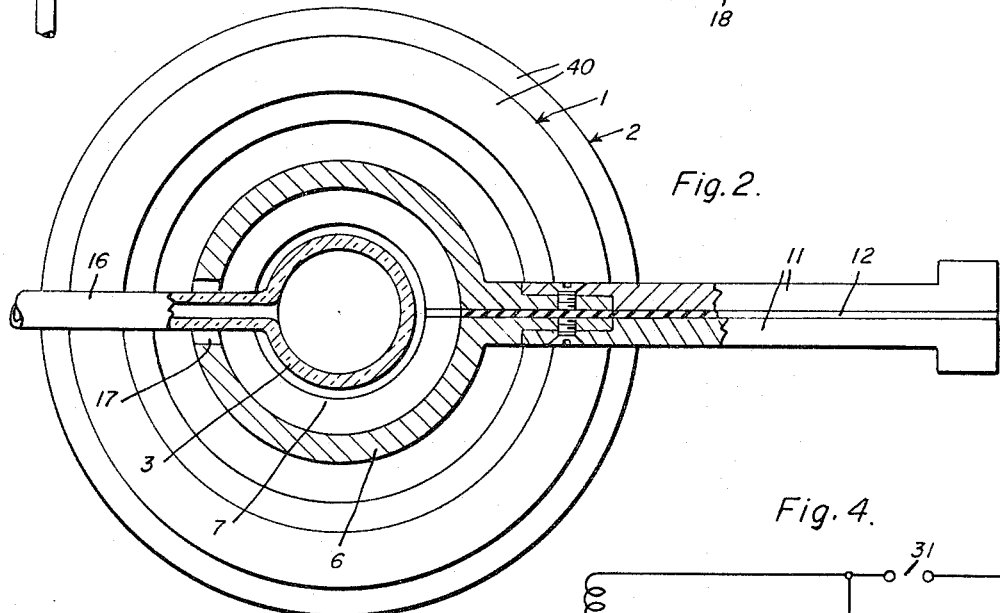
Figure 4:
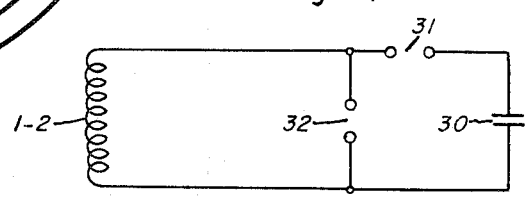
Figure 3:
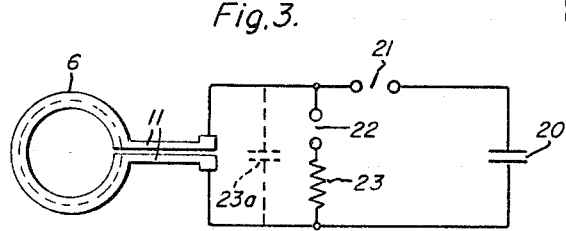
Figure 5:
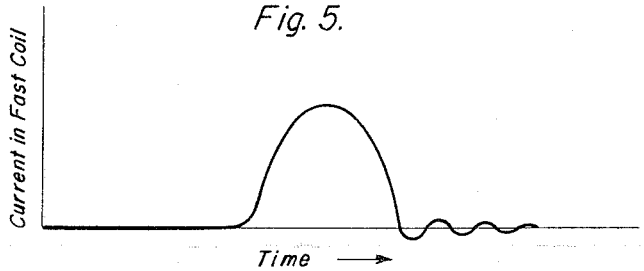
Figure 6:
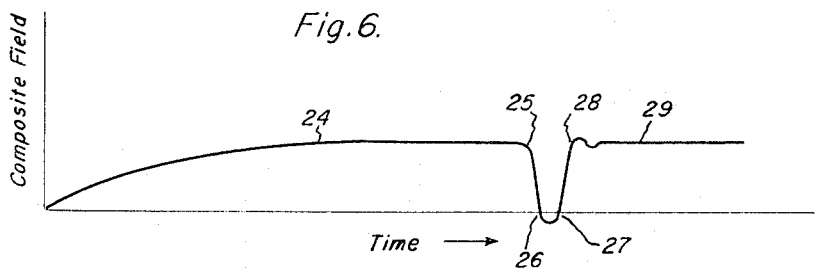
Figure 7:
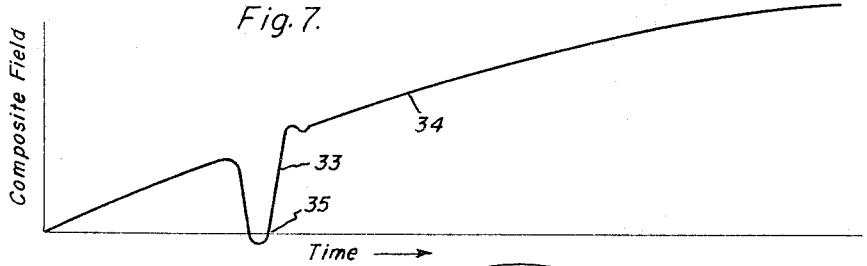
Figure 8:
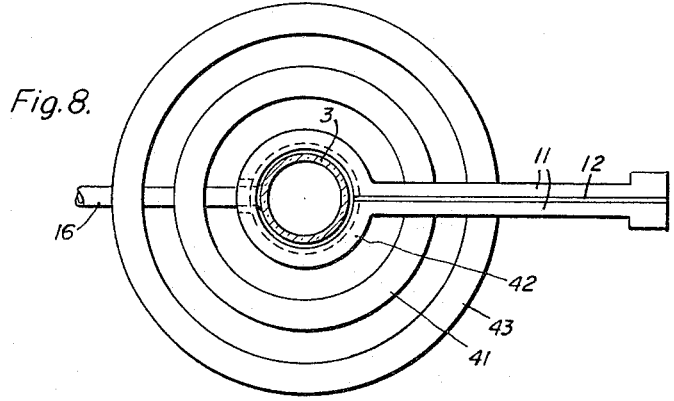
Figure 9:
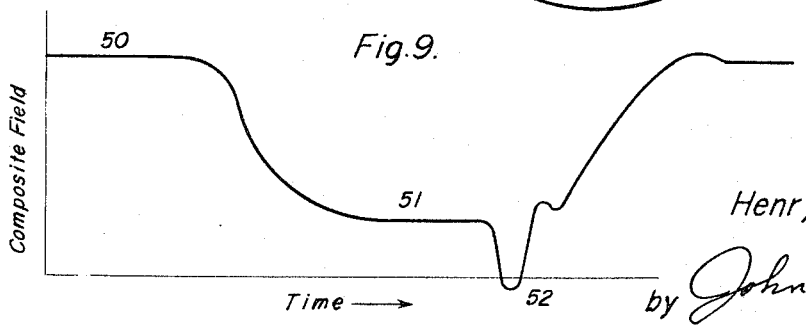

The subject matter which I regard as my invention is particularly pointed out and distinctly claimed in the concluding portion of this specfication. The invention, however, both as to organization and method of operation, together with further objects and advantages thereof, may best be understood by reference to the following description taken in connection with the accompanying drawings wherein like reference characters refer to like elements and in which:

FIG. 1 is a plan view of a first embodiment of apparatus in accordance with the present invention, FIG. 2 is a cross-section taken at 2—2 in FIG. 1, FIG. 3 is a schematic diagram of a crow-barring circuit for supplying the fast coil in the FIG. 1 apparatus, FIG. 4 is a schematic diagram of a crow-barring circuit for supplying the slow coil of the FIG. 1 apparatus, FIG. 5 is a waveform of current in the fast coil in accordance with the present invention, FIG. 6 is a waveform of composite currents or fields superimposed as they affect the plasma in a first mode of operation in accordance with the present invention, FIG. 7 is a waveform of composite currents or fields superimposed as they affect the plasma in a second mode of operation in accordance with the present invention, FIG. 8 is a cross-sectional schematic view of another apparatus in accordance with the present invention, FIG. 9 is a waveform of composite fields in accordance with the FIG. 8 embodiment, FIG. 10 is a waveform illustrating another mode of operation in accordance with the present invention, FIG. 11 is a cross-sectional detailed view of the FIG. 1 apparatus, further illustrating a superconducting shield, and FIG. 12 is a plan view of one possible toroidal topology in accordance with the present invention.

The method and apparatus in accordance with a preferred embodiment of the present invention, provides a first magnetic field of relatively long time duration field, as well as a second effective magnetic field opposed to the first but of relatively short time duration. The second field at least substantially cancels the first field in its effect upon a plasma discharge for a very short time period, after which the second field rapidly decreases allowing a rapid compression of plasma by the first field with further containment of the plasma by the first field. Preferably the second field exceeds the magnitude of the first field so the net field reverses for a short period.

Referring to FIGS. 1 and 2, the first field which may be termed a slow or relatively steady D.C. field is generated by passing a direct current through annular D.C. coil sections 1 and 2 spaced along and coaxially surrounding cylindrical plasma discharge tube 3, made of quartz or a suitable material or composite which, by virtue of its insulating properties, does not allow current to flow in the circumferential direction. Coil sections 1 and 2 are multi-turn coils serially connected through leads 8 to a common power supply (not shown) whereby these coils contribute to a common field in a common direction along tube 3. Larger coil sections 2 are disposed at either end of quartz tube 3 with smaller coil sections 1 spaced at intervals therebetween. Coil sections 1 and 2 are preferably constructed to provide a steady axial field of 100 kilogauss or more, and the coil windings are desirably cryogenically cooled so that by virtue of their low temperature and material of construction they have low electrical resistivity, or are superconducting. The coils are shielded from high frequency fields within shields 40, except for conductor lead openings, a small traverse gap in each shield preventing closed circumferential low frequency current paths in the shields themselves. These shields are thicker than the high frequency skin depth and prevent high frequency voltage components between turns of the coils. Capacitors may be connected across the terminals of coil sections 1 and 2 to provide a high frequency short circuit. The axial magnetic field in plasma discharge tube 3 is stronger at either end of the plasma discharge tube due to the larger size of coil sections 2, thereby resulting in a magnetic "mirror" configuration along the tube tending to confine a plasma to within the longitudinal limits of the tube.

A one-turn cylindrical coil 6 having inwardly extending mirror portions 7 at either end thereof is used to establish a fast field temporarily opposing the relatively steady field of coil sections 1 and 2 in the region of the discharge tube. Cylindrical coil 6 is longitudinally split and a pair of conducting plate leads 11 are connected thereto, while insulation 12 separates these conducting plate leads. One-turn cylindrical coil 6 intervenes between coil sections 1 and 2 and the discharge tube 3. Therefore the leads 11 are provided with openings to receive coil sections 1 and are notched at either side to provide passage of coil sections 2. The coil 6 is desirably configured to have an inner surface parallel to the magnetic field produced by coil sections 1 and 2.

Since the coil sections 1 and 2 are multi-turn and relatively large in inductance as compared to one-turn coil 6, the coil sections 1 and 2 have a relatively long time constant in comparison to coil 6. When voltage is applied to coil sections 1 and 2, the build up of current in coil sections 1 and 2 is relatively slow and likewise the reactive nature of these coils tends to prolong the current flow therein. Therefore the axial magnetic field produced by coil sections 1 and 2 will be relatively slow to build up and relatively slow in dying out, whereas the field of fast coil 6 is capable of rapid change.

Quartz discharge tube 6 is supported within the coils and joined at either end to metal portions 4 with metallic electrode seals 5. An evacuating tube 13 communicates with one end portion 4 through a valve 14 to evacuating pump 15 used in evacuating the region of the discharge tube. A second tube 16 communicates within the central portion of discharge tube 3 through an opening 17 in the central portion of fast coil 6. This tube passes a gas, consisting of for example a mixture of deuterium and tritium, from a gas container 18 to the discharge tube 3 via valve 19. The plasma in the discharge tube is subsequently composed in large part of the ionized form of the gas from container 18.

The gas in discharge tube 3 may be partially ionized or preionized in several ways to provide a desired level of preionization by the time the resultant fields start to increase from zero value. For example, after the gas has been admitted to discharge tube 3, and during the time when the composite field reverses, a high voltage applied between end portions 4 may be used to initiate a discharge. Alternatively a very high frequency current in one or more of the surrounding coils is capable of preionizing the gas, or a special coil may be included for that purpose. This action may be provided, for example, by the saturable reactor method of Westendorp and Hurwitz, as described in the Review of Scientific Instruments, vol. 31, No. 6, pps. 662–663, June 1960. After the gas is preionized, the magnetic field provided by the coils surrounding the discharge tube acts to compress the gas, achieving fuller ionization and high compression of the resulting plasma as hereinafter more fully described.

According to one form of the present invention, the coil sections 1 and 2 first have direct current applied thereto, and then a short pulse of relatively high frequency alternating current is applied to fast coil 6 producing a magnetic field axially in discharge tube 3 in opposition to the field of coil sections 1 and 2 but of the same or preferably somewhat greater magnitude in discharge tube 3. The high frequency field of fast coil 6 is conveniently initiated with a capacitor discharge as illustrated in FIG. 3. Referring to FIG. 3, fast coil 6 has its lead plates 11 coupled to a capacitor bank 20 through a switching device 21 which may comprise a triggered spark gap device or plurality of triggered spark gaps in parallel. Such a spark gap device is described and claimed in Westendorp Patent 2,997,623, dated August 22, 1961. The capacitor bank 20 is charged, by means not shown, then discharged through spark gap 21, supplying a large current through fast coil 6. The LC product of the fast one-turn coil system is small and hence its time constant is quite short; therefore this discharge will product a high frequency pulsation of magnetic flux within fast coil 6. The coil 6, after receiving one-half cycle of the discharge current, is desirably short-circuited through a second spark gap 22 in series with a non-linear resistor 23, the resistance of which increases as current flow decreases. This resistor acts to dampen oscillation of current through fast coil 6 therefore producing a waveform such as illustrated in FIG. 5. It is noted current substantially dies out after one half cycle thereof leaving only a short high frequency pulsation. The field resulting from this pulsation is shown on a different time scale in FIG. 6 in conjunction with the field from coil sections 1 and 2. Here the D.C. field is applied to coil sections 1 and 2, reaching a relatively steady value at point 24 on the curve, after which the fast coil field is applied at a time corresponding to point 25. Since the field from the fast coil 6 opposes that from coils 1 and 2, and is approximately equal or preferably somewhat greater in value, the net field declines to zero at point 26 and may have an excursion in the negative direction. At point 27 the net field is again zero. Shortly prior to this time the gas in the discharge tube 3 is desirably ionized or preionized by one of the means mentioned. Then a fast plasma compression results as the field from the fast coil dies out at 28 leaving the D.C. field at 29, thereby producing a sustained containment of the plasma at a high field value. It is noted the slow field of coil sections 1 and 2 is incapable of rapid change for adequately heating the plasma; however the two fields cooperate to produce fast compression for heating, plus extended containment for a time period on the order of several milliseconds or more. The operation of apparatus in accordance with the present invention is conveniently timed employing conventional control circuitry, as well known to those skilled in the art, for delivering the periodic electrical pulses applied to trigger the respective spark gaps and for initiating preionization voltage. Typically a half wave of current in the fast coil has a duration on the order of ten microseconds. Preionization is typically initiated approximately one to five microseconds before the net field is zero at 27, to allow a desired degree of ionization before compression.

The magnetic field trapped in the plasma can be controlled by timing of preionization. In particular, inasmuch as the plasma can be ionized at substantially zero magnetic field, the plasma can have a high value of beta, that is, the plasma can have a relatively high energy density relative to magnetic pressure.

$$\beta = \frac{\text{plasma pressure}}{\text{magnetic pressure}} = \frac{p_{\text{plasma}}}{\frac{B^2 \text{ external}}{8\pi}}$$

In this expression $B_{\text{external}}$ equals the magnetic field outside the plasma. $P_{\text{plasma}}$ equals plasma pressure. Also, ideally, $$\frac{B^2 \text{ external}}{8\pi} = p_{\text{plasma}} + \frac{B^2 \text{ internal}}{8\pi}$$

where $B_{\text{internal}}$ is the field inside the plasma. Therefore the plasma compressed is a higher energy density or higher beta plasma when the magnetic field is substantially external to the plasma, that is when as little field as possible is trapped internally at the time the gas is ionized. Furthermore a trapped field of too large a magnitude in the opposite direction to the external field may induce undesirable turbulence. The present invention in facilitating flexibility of the field at preionization is efficacious in solving the problem of compressing and holding a plasma of proper beta for simultaneously optimizing heating and stability. In attaining this result the applied magnetic field desirably goes through zero with a high slope as the plasma is initially ionized, after which the plasma is confined in a relatively large confinement field. Therefore the field of the fast coil should be larger in magnitude than the field of the D.C. coil sections, so that as the fast field dies out, the composite field rapidly goes through zero and then increases to the desired value for heating and confinement.

In the foregoing explanation, the field of coil sections 1 and 2 is described as a D.C. field, whereas it need be only quasi D.C. In practice it is only necessary that the field of coil sections 1 and 2 be relatively slow or of relatively long duration as compared with the field of fast coil 6. Use may be made of the inertia characteristic of the field from coil sections 1 and 2 which results from the comparatively higher inductance of coil sections 1 and 2. In such case the field of fast coil 6 is conveniently termed a high frequency field while the field of coil sections 1 and 2 is termed a low frequency field.

In the case of convenient capacitor energization of coil sections 1 and 2 the circuit illustrated in FIG. 4 may be used. Referring to FIG. 4, the coil designated 1-2 is coupled across a capacitor bank 30 through switching device 31, coil 1-2 representing coil sections 1 and 2 in series. Switching device 31 as well as a second switching device 32 connected across coil 1-2 are conveniently of the spark gap variety set forth and claimed in the aforementioned Westendorp patent. Prior to preionization of the gas in discharge tube 3, switching device 31 is operated to discharge the capacitor bank 30 through coil 1-2. Since coil 1-2 is a multi-turn structure, it has a high $L/R$ ratio and a long time constant as compared with fast coil 3. Thus as the capacitor bank 30 is discharged through coil 1-2, the current will be relatively slow to build up and relatively slow to die out as illustrated in FIG. 6, and thus provides what may be termed a quasi D.C. field through coil sections 1 and 2. Capacitor bank 30 should be quite large in order to provide sufficient current through coil sections 1 and 2. The field produced by sections 1 and 2 should desirably be at least 100 kilogauss. Under these circumstances the A.C. field generated by fast coil 6 is desirably somewhat larger, for example, 140 kilogauss.

A switching device or triggered spark gap 32 may be employed to short-circuit or crow-bar coil 1-2 after discharge of capacitor 30, thus aiding and sustaining the field in coil 1-2. This type of operation is well known to those skilled in the art. Likewise, the rapid coil may be short-circuited by a triggered spark gap, with or without the series non-linear resistor, after the first half-cycle and before the third half-cycle of fast coil operation to prevent the magnetic field from decreasing significantly below its D.C. value after the plasma has been compressed in the last part of the first half-cycle. The engineering problems associated with the short-circuited or crow-barred coil are simpler than the problems associated with the conventional crow-barring arrangement known in the art, since the short-circuiting takes place when the high frequency capacitor bank is charged close to its peak voltage. Therefore the energy required to build up the arc in a spark gap is readily available.

In some instances it is desired that the D.C. field not reach its maximum value before initiation of a high frequency fast field in fast coil 6. FIG. 7 illustrates such a situation wherein the fast field of coil 6 at 33 is superimposed on a rising slow field illustrated at 34. In accordance with this mode of operation, the circuit of FIG. 4 is operated to discharge capacitor bank 30 through coil 1-2, and fast coil 6 is energized using the FIG. 3 circuit, before the field of coil 1-2 reaches its maximum value. As before, the gas in tube 3 is to be preionized at approximately point 35 in FIG. 7, that is approximately or slightly before the net field goes through zero in the positive direction. Under the circumstances of FIG. 7 operation, the plasma is rapidly compressed at 33, thereby rapidly raising the plasma temperature and pressure, and is then contained in the slow field at 34. However, since the slow field is still rising, further adiabatic plasma heating takes place resulting in a higher density plasma over a longer period of time. In this mode of operation, the peak of the slow field should be somewhat larger relative to the fast field than hereinbefore described; that is, the peak value of the slow field should be larger than the high frequency field. Alternatively speaking, the high frequency field need only oppose a fraction of the slow field inasmuch as the high frequency field opposes the slow field at a lower value thereof. As an illustration, if the peak field produced by the slow coil system is 200 kilogauss and the fast coil is actuated when the slow field has risen to 50 kilogauss, the peak field produced by the fast coil need be only about 70 kilogauss. Note the peak field produced by the fast coil should be significantly greater than the instantaneous value of the field produced by the slow coil in order that the voltage gradient around the plasma when the field goes through zero is again reasonably high. The just described mode of operation reduces the requirements on the fast coil and associated circuitry. The fast coil is energized typically a millisecond after energization of the slow coil system.

It will be apparent to those skilled in the art that many modifications and generalizations are possible in accordance with the foregoing principles of the present invention. For example, a concentric three-coil system illustrated schematically in FIG. 8 may be used to advantage. In this system a main confining field is produced by a large cross-section, high strength superconducting coil system 43, and a second medium speed coil system 41 closer to the plasma tube 3 is used to produce a transient field partially opposing the main field. When the current in the second coil system is near its peak, a third coil 42 directly around the discharge tube is activated to further oppose the initial field and thereby reverse the direction of the composite field. Prior to the termination of current in the third coil 42, the gas is ionized so the subsequent rapid increase of the composite field will cause heating and compression. After the opposing field produced by the third coil 42 has terminated, the composite field will be in the direction of the main field, but smaller in magnitude due to the opposing field still produced by the second coil 41. The subsequent fall of current in the second coil system 41 will cause the composite field to further increase toward the value of the main field, thereby providing further, albeit slower, compression of the plasma. The composite field waveform is illustrated in FIG. 9 wherein the field of coil 43 is illustrated at 50, the composite field from coils 43 and 41 is shown at 51, and the entire composite field is indicated at 52. In the system of FIG. 8 there must be adequate cross-sectional area between the first and second coil systems and the second and third coil systems to allow for the displaced magnetic field lines without undesirably large magnetic energy.

The time constant of the second coil system 41 and its associated capacitor supply can be several times longer than the corresponding time constant of the third or inner coil system 42. The use of this threefold composite system of FIG. 8 further facilitates achieving the desired high rate of initial compression and the desired magnitude of final magnetic containment field.

Further advantageous modifications relate to circuitry for providing the current in the inner fast coil system. It is evident that by providing additional capacitor banks and suitably timed spark gap switches, it is possible for the current pulse in the fast coil to be made to have a relatively flat top as at 53 in a composite field illustrated in FIG. 10. Such an arrangement serves to reduce the amount by which the composite field goes negative while at the same time maintaining or even, desirably, increasing the rate at which the composite field rises through the zero value. Such operation facilitates achieving the desired initial condition for compression with a high initial degree of ionization and low trapped magnetic field since preionization takes place during a time period when the net field is very low. An advantageous addition to the circuit of FIG. 3 comprises a small capacitor 23a connected across the leads to fast coil 6 as shown by dashed lines. This capacitor, in conjunction with lead inductance, will lower the voltage transient appearing at the terminals of the coil when spark gap 21 is actuated, and thereby will further minimize any tendency of gas to preionize prematurely.

A modification which may be applied to apparatus according to the present invention, having the effect of aiding its stability of operation, relates to images induced in the fast coil 6 as the plasma begins to approach this cylinder; the effect is attributable to currents induced in the fast coil by the plasma. Since the fast coil is not a perfect conductor, this effect may be suitably aided and prolonged by imbedding in the fast coil a highly cooled material which may be superconducting or at least of extremely small resistance at the low temperature of operation. Such superconducting or cooled core, illustrated at 39 in the detail of FIG. 11, extends around an inner fast coil 6 and a suitable distance along conductors 11. The superconducting or cooled core 39 is surrounded by an outer portion of coil 6. The thickness of the non-superconducting part of fast coil 6 should be just sufficient to shield the superconductor from any voltage gradient which might inhibit low core resistance when the fast coil is being activated. On the other hand, the thickness of fast coil 6 in this instance should be no larger than required for adequate shielding of the core, since the core material should be as close to the plasma as possible. Note that the existence of a gap for passage of lead plates 11 through the core does not inhibit its stabilizing effect since coil sections 1 and 2 prevent the gross leakage of magnetic lines through the gap.

It is apparent to those skilled in the art that this modification of imbedding cooled highly conducting material in the fast coil allows a high degree of desirable prolonged control of the magnetic field configuration in the vicinity of the plasma. Although the total magnetic flux through the fast coil changes with time in the course of operation, the magnetic field direction is permanently constrained to be everywhere parallel to the surface of the superconducting core. Hence desirable field configurations with respect to plasma containment and stability can be maintained even after the net current flow through the fast coil has terminated.

In the apparatus according to the present invention, the discharge tube 3 should be short or long compared to the plasma mean free path in the tube. In the latter and preferred case, if the tube is made sufficiently long, e.g. several tens of feet, the loss of plasma in the ends of the tube is independent of the length of the tube so that containment time is proportional to the length. Moreover, it is desirable the confining field be shaped or spacially modulated in such fashion as to improve the stability of the confined plasma. It is readily apparent that attainment of longitudinal and/or azimuthal variation in the field strength of any desirable form may be achieved within the context of this invention by suitably spacing the coils 1 and 2, by suitably shaping the fast coil 6, and/or by the addition of longitudinal stabilizing current carrying conductors of the Ioffe type to provide magnetic lines of force convex toward the plasma. Suitable shaped highly conducting shields as described above may also be used for this purpose.

An arrangement for achieving an effectively long tube to eliminate end losses of plasma is illustrated in FIG. 12, which is a plan view of a stellerator apparatus or apparatus of toroidal topology utilized in accordance with the present invention. This embodiment is substantially the same in construction and operation as the one hereinbefore described, with respect to like elements referring to like reference numerals. In general, two assemblies of the FIG. 1 type are disposed along the straight sides of discharge tube 36. In the FIG. 12 illustration, slow coil sections 1, disposed axially along the tube between mirror coil sections 2, are illustrated as two in number for illustrative purposes only, as it is realized a larger number thereof is frequently desirable. Likewise fast coils 6 are desirably longer in the case of a greater number of coil sections 1.

In the FIG. 12 apparatus, a common container 18 supplies gas to the central area of the straight portions of discharge tube through valves 19. The toroidal topology apparatus of FIG. 12 also includes the conventional field shaping windings for achieving equilibrium and stability of the plasma in the toroidal geometry. These may be stellerator type as in FIG. 12 including stabilizing windings 37, and axial windings 38 around the curved portion of toroidal tube configuration as well known to those skilled in the art. The toroidal topology configuration has the advantage of eliminating end effects, thereby further limiting any escape of plasma from the discharge tube. Several variations of the toroidal topology configuration are possible for achieving desirable advantages in containment and stability of the plasma.

In accordance with the present invention, the separation of the functions of heating and containment as described hereinbefore makes possible the incorporation of such modulations and variations of the magnetic field which exists after the magnetic heating and compression as may be deemed necessary or advantageous for stable plasma confinement, e.g. to provide lines of force convex toward the plasma. In addition to the configuration indicated in FIG. 12, such field configurations include but are not limited to the bumpy torus configuration, the Meyer-Schmidt configuration, and toroidal developments of the Ioffe positive gradient configuration. The provision of suitable modulation and curvature of the magnetic lines of force may be accomplished by periodic or other variations in spacing and cross section of coils 38 in FIG. 12 to provide convex flux toward the plasma, and by adjusting the spacing, pitch, and current level and direction of windings 37. Windings 38 are conveniently operated in the same manner as and at the same time as coil sections 1 and 2 hereinbefore described. It is also possible to induce a suitably programmed and persisting longitudinal current in the plasma to enhance stability by coupling a circumferential electromotive force to the toroidal plasma as done in toroidal pinch machines and stellarators employing ohmic heating.

In application to configurations of toroidal topology, it is usual for the fast coil to subtend only a part of the entire containment volume shown in FIG. 12, so that complex engineering provisions required for plasma heating may be conveniently separated from provisions required to optimize toroidal containment. It is desirable in general to adjust the physical shape and orientation of the fast coil and the configuration of the slow coils so that the inner surface of the fast coil is everywhere parallel to the desired confining magnetic field configuration produced by the slow coil system. In this way the programmed changes in magnetic field as hereinbefore described can be accomplished without the passage of magnetic lines of force through the inner surface of the fast coils at any stage. With this arrangement, energy dissipation due to eddy currents in the fast coils is minimized and in addition the fast coil structure provides desirable rigidity to the containment field configuration as hereinbefore described.

Since in the containment phase, occurring after the plasma heating, the plasma will occupy a toroidal volume in a sensibly uniform fashion, it is desirable to properly operate the toroidal apparatus for transition from localized heating by action of the fast coil system to the quasi-uniform containment phase. This transition can be facilitated by suitable adjustment of the ratio of gas which it is desirable to have initially present in the entire discharge tube to gas subsequently injected by a fast valve operation in the heating region. For this purpose, low pressure gas from container 18 is introduced before operation of the device, and allowed to diffuse around the torus. A finite proportion of initially uniform background gas is desirable since, by preionizing this gas at or before the time of preionization of later introduced gas in the fast coil regions, electrically conducting paths are provided in the confinement volume that prevent the formation of disruptive electrical fields. The higher pressure gas for heating in the fast coil region is introduced just before, e.g. 50 microseconds before, onset of preionization thereof. In this mode of operation, the ratio of ionized but unheated gas to heated gas in the fast coil region must be kept within proper bounds (e.g. desirably less than a factor two) either by limiting the volume of the portions of the discharge tube in which heating does not occur, or by limiting the ratio of gas initially present to gas injected into the fast coil region or both. It is evident that the former procedure is highly feasible since the cross-sectional area, and hence volume, of the sections outside the fast coil regions may be made substantially smaller than that of the sections in the region of the fast coil. Furthermore, the stable transition of plasma into the unheated section may be facilitated by provision of suitably disposed portions of the containment magnetic field which are convex toward the plasma and serve, by the high stability of such configurations, to deflect plasma emerging from the heating sections around the end sections of the toroidal topology containment geometry. In the case of toroidal topology configurations, proper preionization can be accomplished by high frequency electrical discharge as in the linear case, or by inducing in the gas a current pulse or pulses around the entire toroid as in the manner of a toroidal pinch or stellerator ohmic heating. Basically this can be accomplished, for example, by connecting a high-voltage, low-impedance source of current to peripheral conductors (not shown) which may pass circumferentially around the discharge tube near to, but insulated from, the gas in the tube. This voltage is inductively coupled to the gas causing it to break down and become highly ionized. Such inductive coupling can be desirably enhanced by incorporating a core of high magnetic permeability and large cross section which links the toroidal discharge tube. The peripheral conductors, which act as the primary of a transformer of which the gas is the secondary, must contain insulated gaps across which the voltage is applied by means of electrical connectors affixed to opposite sides of the gaps. The conductors may be relatively wide so as to almost completely cover the discharge tube but must be separated by insulated channels in the peripheral direction to allow free penetration into the discharge tube of magnetic field lines produced by the fast and slow coils. In addition, such conductors must be electrically insulated from the fast coil.

The method in accordance with the present invention of obtaining a reasonably high beta plasma in a confining magnetic geometry for a reasonable period is applicable to a large class of confinement geometries. The D.C. or slowly varying field can be tailored to fit the needs of long term stability in various types of apparatus configurations. Basically then, the present invention relates to obtaining plasma compression and confinement by means of opposing a large slow magnetic field with a fast relatively short time constant field at least equal in strength to the slow field at the instant of application of the fast field, to cancel or reverse the slow field. Whereas a coil producing a slow sustained long time constant field cannot provide the high gradient or rapid field compression required for effective plasma heating, the opposition thereto of a fast high frequency field in effect produces rapid compression, after which the slow field confines the heated plasma. The high frequency field cancelling the slow field may thus be thought of as temporarily displacing the magnetic field lines of the slow field, after which the rapid decay of the current in high frequency coil allows the slow field lines to rapidly snap back into their original position and compress the plasma formed in the time interval when the magnetic field is low.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A plasma containment apparatus comprising a plasma discharge tube for supporting an axial plasma discharge therein, first magnetic means for producing a first magnetic field about said plasma discharge in compressive relation to said discharge, and second magnetic means for producing a second magnetic field about said plasma discharge also in compressive relation to said discharge, said second magnetic field being of short duration and having a rapid rise and fall time in comparison to said first magnetic field, wherein the means for producing said second magnetic field produces said field in opposition to said first field to substantially cancel said first field for the short duration of said second field whereby the net compressing field rises rapidly at the conclusion of said second field.

2. A method of rapidly compressing and containing a plasma comprising the steps of subjecting a plasma to a first substantially external magnetic field of a relatively long time period which field has a compressive relation to said plasma, and during the same period subjecting the plasma to a second substantially external magnetic field also in compressive relation thereto of a relatively short time duration compared to said first magnetic field, said second magnetic field being of a value and direction for substantially cancelling said first magnetic field for substantially the short duration of said second magnetic field whereby the net magnetic field compressing said plasma rapidly rises upon the conclusion of said second magnetic field.

3. The method of claim 2 wherein said plasma is preionized at a time when said first magnetic field is substantially cancelled.

4. The method of claim 2 wherein said first field is the net resultant field of a plurality of applied fields.

5. Apparatus for containing a plasma comprising a plasma discharge tube for axially housing plasma therein, a first magnetic coil means axially surrounding said tube, coupling means supplying a current to said first magnetic coil means to establish a first magnetic field within said discharge tube in compressive relation to said plasma, second magnetic coil means also axially surrounding said discharge tube, said second coil having a very short time constant as compared to said first coil, and means for supplying current to said second coil means for a duration of time relatively short as compared with the current supplied to said first coil means for temporarily cancelling the field of said first coil means.

6. The apparatus according to claim 5 further including switching means for short-circuiting said second coil means after current is applied thereto.

7. The apparatus according to claim 5 wherein said second magnetic coil means has an inner surface substantially parallel to the magnetic field produced by the first magnetic coil means.

8. The apparatus according to claim 5 wherein said second coil means comprises a one turn plate of conductive material forming a cylinder coaxial with said discharge tube and provided with end conductors, said cylinder having a longitudinal separation at which said end conductors are joined to said coil, said coil also having inwardly extending portions at either end of said cylinder to provide a magnetic mirror configuration to said plasma.

9. Apparatus according to claim 8 wherein said first coil means comprises a plurality of separate coil sections spaced along said discharge tube outside and along said second coil means.

10. The apparatus according to claim 5 wherein said first coil means has a relatively long time constant and further comprising coupling means providing a current discharge thereto having a period which is long compared to the current supplied said second coil means.

11. A plasma containment apparatus comprising a plasma discharge tube for supporting an axial plasma discharge therein, first magnetic means for producing a first magnetic field about said plasma discharge in compressive relation to said discharge, second magnetic means for producing a second magnetic field about said plasma discharge also in compressive relation to said discharge, said second magnetic field being of short duration in comparison to said first magnetic field, wherein the means for producing said second magnetic field produces said field in opposition to said first field to at least substantially cancel said first field for the short duration of said second field whereby the net field compressing said plasma rises rapidly at the conclusion of said second field, and means for initially preionizing said plasma at a time when said first field is at least substantially cancelled.

12. In a magnetic field apparatus for rapid heating and subsequent containment of a plasma, the method of preionizing, compressing and containing said plasma to attain a controlled trapped field, comprising providing a relatively long time period magnetic field for compressing said plasma, cancelling said magnetic field for a relatively short time period to produce a net field on said plasma which is less than or substantially equal to zero, preionizing said plasma while said field is cancelled and in the range of net magnetic field from substantially zero field to a field of a first relatively negative value, and rapidly compressing said plasma by restoring said field, said field having a relatively positive value.

13. Apparatus for containing a plasma comprising a plasma discharge tube for axially housing plasma therealong, first magnetic coil means axially surrounding said tube at spaced intervals, coupling means supplying a current to said first magnetic coil to establish a magnetic field within said discharge tube in compressive relation to said plasma, a second magnetic coil disposed within said first coil also axially surrounding said discharge tube, said second coil having a very short time constant relative to said first coil, and means for supplying current to said second coil for a duration of time relatively short as compared with the current supplied to said first coil for temporarily cancelling the field of said first coil wherein said discharge tube is of extended length compared to the plasma mean free path.

14. An apparatus for containing a plasma comprising a toroidal configuration including a plasma discharge tube closed upon itself, first magnetic coil means axially surrounding a portion of said discharge tube, coupling means for providing a current to said first magnetic coil means, second magnetic coil means also surrounding a portion of said discharge tube in the area of said first magnetic coil means and coupling means supplying a current of short duration to said second coil means for substantially cancelling the magnetic field of said first coil means within said discharge tube for substantially the short duration of said current supplied said second coil means.

15. In an apparatus for heating and confining a plasma in a toroidal configuration including a plasma discharge tube closed upon itself and means along portions of said tube providing rapid heating of said plasma, the method of providing for heating and transition to a stable quasi-uniform toroidal confinement, said method comprising the steps of initially introducing low density gas for ionization into substantially the entire volume of said toroidal configuration, providing a relatively long time period magnetic field for compressing and containing said plasma, cancelling said magnetic field for a relatively short time period to produce a net field on said plasma less than or substantially equal to zero, introducing higher density gas into at least one of said portions and providing preionization of the gas in said portions while said magnetic field on said plasma is cancelled and rapidly restoring said magnetic field, whereby the conductivity of the entire volume prevents buildup of destructive electric fields between said portions.

16. A magnetic field apparatus for heating and confining a plasma in a toroidal configuration path including a plasma discharge tube closed upon itself, means along portions of said tube for providing rapid compression of said plasma including means providing a long time period magnetic field in compressive relation to said plasma and means for cancelling and rapidly restoring said field, and means along other portions of said toroid configuration shaping the magnetic field in said other portions to provide magnetic flux curved toward the plasma in said tube at plural locations in said other portions for inwardly deflecting the plasma in said other portions toward the center of the plasma in said toroidal configuration path.

References Cited by the Examiner

UNITED STATES PATENTS

| | | | |
|---|---|---|---|
| 3,006,835 | 10/1961 | Quinn et al. | 176—7 |
| 3,015,618 | 1/1962 | Stix | 176—3 |
| 3,089,831 | 5/1963 | Kolb | 176—1 |
| 3,105,027 | 9/1963 | Carruthers et al. | 176—1 |
| 3,116,209 | 12/1963 | Hall | 176—3 |
| 3,200,268 | 8/1965 | Weibel | 176—3 X |

OTHER REFERENCES

Samuel Glasstone et al., Controlled Thermonuclear Reactions, 1960, pp. 414–421.

REUBEN EPSTEIN, *Primary Examiner.*